United States Patent [19]
Thornburgh

[11] 3,915,132
[45] Oct. 28, 1975

[54] IGNITION TIMING CONTROL
[75] Inventor: William F. Thornburgh, Rochester, Mich.
[73] Assignee: General Motors Corporation, Detroit, Mich.
[22] Filed: Oct. 31, 1974
[21] Appl. No.: 519,529

[52] U.S. Cl. .................. 123/117 A; 91/183; 92/48; 92/64
[51] Int. Cl.² ...................... F02P 5/02; F01B 1/00
[58] Field of Search..... 123/117 A, 117 R, 146.5 A; 92/48, 63, 64; 91/170 R, 183

[56] References Cited
UNITED STATES PATENTS

| | | |
|---|---|---|
| 2,596,830 | 5/1952 | Udale.............................. 123/117 A |
| 2,768,818 | 10/1956 | Egerer ................................. 92/48 X |
| 3,043,285 | 7/1962 | Bettoni ........................ 123/117 A |
| 3,077,186 | 2/1963 | De Beaubien et al. ................. 92/48 |
| 3,187,640 | 6/1965 | Young et al. ............................ 92/48 |
| 3,411,414 | 11/1968 | Brown et al. ........................... 92/48 |
| 3,433,132 | 3/1969 | James ...................................... 92/48 |
| 3,515,105 | 6/1970 | Soeters .......................... 123/117 A |
| 3,780,713 | 12/1973 | Julian............................... 123/117 A |

Primary Examiner—Charles J. Myhre
Assistant Examiner—Tony Argenbright
Attorney, Agent, or Firm—C. K. Veenstra

[57] ABSTRACT

A vacuum motor, connected to the distributor to control ignition timing, has one diaphragm responsive to a first, full manifold vacuum, signal to provide limited initial advance of ignition timing and another diaphragm responsive to a second induction vacuum signal, originating at a port traversed by the throttle, to provide additional advance of the timing. A valve controlling exhaust gas recirculation also responds to the second signal, and ignition timing is thus coordinated with exhaust gas recirculation.

2 Claims, 1 Drawing Figure

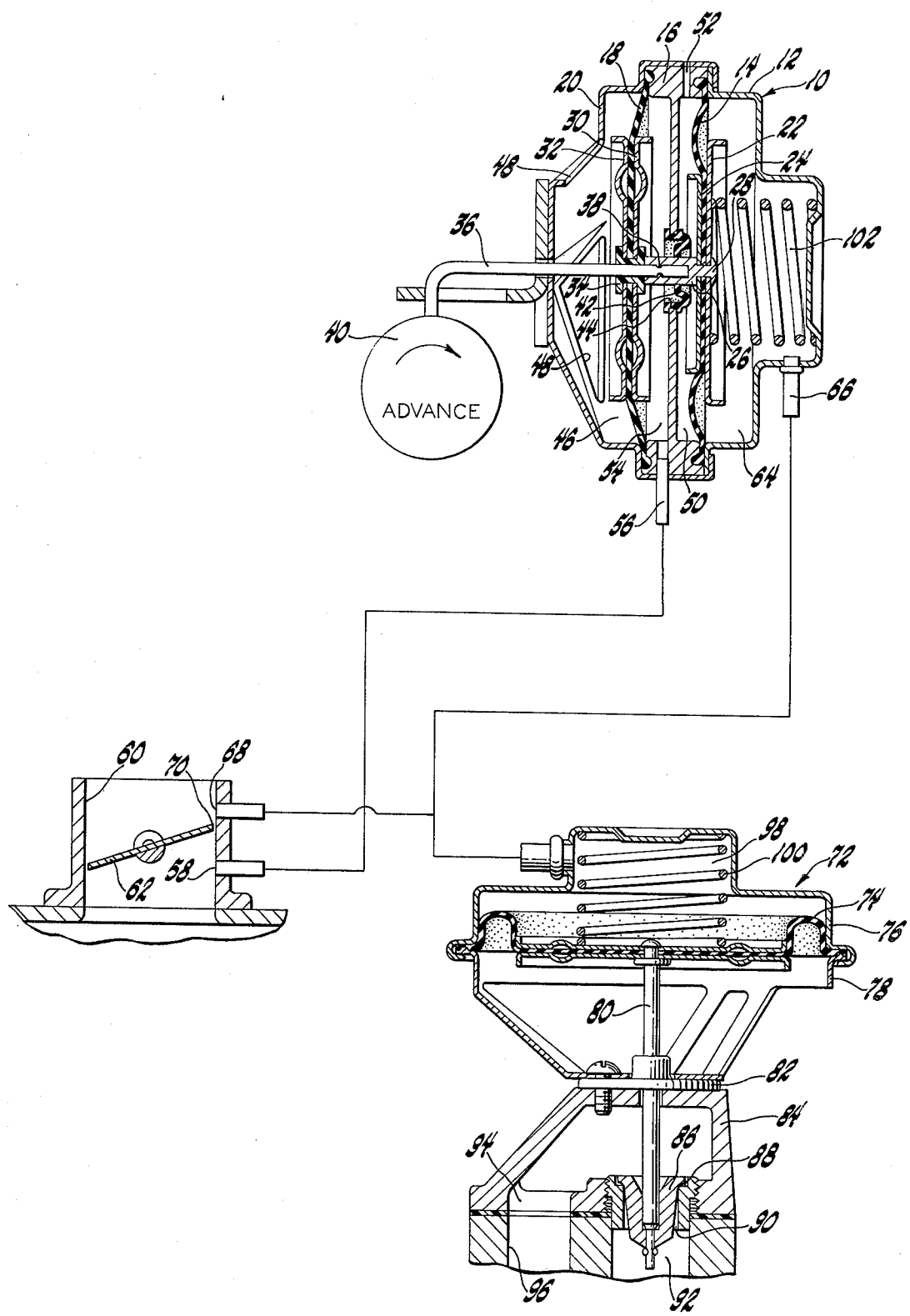

IGNITION TIMING CONTROL

This invention relates to ignition timing control and, more particularly, to a vacuum motor, connected to the distributor to control ignition timing, which has one induction pressure responsive diaphragm providing limited initial advance of the timing and another diaphragm which responds to another induction pressure signal to provide additional advance of the timing.

The ignition timing control provided by this invention is preferably used with an exhaust gas recirculation (EGR) system. Such systems have been proposed and used to reduce formation and emission of oxides of nitrogen from internal combustion engines. In the system shown in U.S. Pat. No. 3,641,989, for example, a valve controls recirculation of exhaust gases in accordance with the vacuum signal created at an induction passage port which is traversed by the edge of the throttle. That system thus prevents recirculation during closed and wide open throttle operation and permits recirculation of exhaust gases at varying rates during part throttle operation.

In some applications of that system, it is considered desirable to advance the ignition timing a limited initial amount of about 15°, for example, whenever the engine is operating with a manifold vacuum greater than perhaps about 4 Hg and to advance the ignition timing an additional amount up to a total of about 28°, for example, as the vacuum signal delivered to the EGR valve increases to perhaps 8 Hg.

This invention provides an ignition timing control which advances the timing in the desired manner. In a control provided by this invention, a vacuum motor, connected to the distributor to control ignition timing, has one diaphragm responsive to a first, full manifold vacuum, signal to provide limited initial advance of ignition timing and another diaphragm responsive to a second induction vacuum signal, originating at a port traversed by the throttle, to provide additional advance of the timing. A valve controlling exhaust gas recirculation also responds to the second signal, and ignition timing is thus coordinated with exhaust gas recirculation.

The details as well as other features and advantages of this invention are set forth in the remainder of the specification and in the drawing which shows a sectional view of a distributor vacuum motor made in accordance with this invention and schematically illustrates its connections with the induction passage and an associated EGR system.

Referring to the drawing, a vacuum motor 10 comprises a cover 12, a diaphragm 14, a divider 16, a diaphragm 18, and a support housing 20. Diaphragm 14 is received between a pair of retainer plates 22 and 24, and their assembly is secured to a connector 26 having a headed portion 28.

Diaphragm 18 is received between a pair of retainer plates 30 and 32, and their assembly is secured in a guide member 34. A link 36 is secured to connector 26 (as by staking as at 38) and is slidably received in guide 34. Link 36 extends to a distributor 40 to control ignition timing therein.

A boot 42 surrounds connector 26 and is received in a central opening 44 of divider 16 to prevent fluid communication between the two sides of divider 16 while permitting reciprocation of link 36 and connector 26.

A chamber 46 defined between housing 20 and diaphragm 18 is open to the atmosphere through a plurality of openings 48. A chamber 50 defined between divider 16 and diaphragm 14 also is open to the atmosphere through a plurality of apertures 52 extending through the rim of divider 16. A chamber 54 defined between diaphragm 18 and divider 16 is connected through a fitting 56 with a tap 58 opening from the engine air induction passage 60. A chamber 64 defined between diaphragm 14 and cover 12 is connected by a fitting 66 with a port 68 opening from the induction passage adjacent the edge 70 of throttle 62.

In operation, with the engine running with a vacuum of more than, for example, 4 Hg, diaphragm 18 is moved rightwardly until retainer plate 30 engages divider 16. During this motion, guide 34 engages connector 26 and moves link 36 rightwardly to advance the ignition timing perhaps 15°. With throttle 62 closed as shown, port 68 senses atmospheric pressure and diaphragm 14 moves only with diaphragm 18. As throttle 62 is opened, however, port 68 senses an increasing proportion of the manifold vacuum downstream thereof, and diaphragm 14 is moved rightwardly. At this time, link 36 slides through guide 34 to further advance the spark. Rightward motion of diaphragm 14 continues until retainer 22 engages cover 12. This may occur when port 68 senses a vacuum of, for example, 8 Hg; at that time, the ignition timing may have been advanced a total of perhaps 28°. The following table sets forth the ignition timing advance (in degrees) provided at varying vacuum levels (in inches of Mercury) sensed by tap 58 and port 68:

| Tap Vac | Port Vac | Adv | Port Vac | Adv | Port Vac | Adv | Port Vac | Adv | Port Vac | Adv |
|---|---|---|---|---|---|---|---|---|---|---|
| 4 | 0 | 15. | 2 | 15. | 4 | 19.5 | — | — | — | — |
| 6 | 0 | 15. | 2 | 15. | 4 | 20. | 6 | 24. | — | — |
| 8 | 0 | 15. | 2 | 15. | 4 | 20. | 6 | 25. | 8 | 25. |
| 10 | 0 | 15. | 2 | 15. | 4 | 19.5 | 6 | 24. | 8 | 27. |
| 12 | 0 | 15.5 | 2 | 15.5 | 4 | 19.5 | 6 | 24.5 | 8 | 27. |
| 14 | 0 | 16. | 2 | 16. | 4 | 20. | 6 | 24.5 | 8 | 28. |
| 16 | 0 | 16. | 2 | 16. | 4 | 20. | 6 | 25. | 8 | 28. |
| 18 | 0 | 16. | 2 | 16. | 4 | 20. | 6 | 25. | 8 | 28. |
| 20 | 0 | 16. | 2 | 16. | 4 | 20. | 6 | 25. | 8 | 28. |
| 22 | 0 | 16. | 2 | 16. | 4 | 20.5 | 6 | 25. | 8 | 28. |
| 24 | 0 | 16. | 2 | 16. | 4 | 20.5 | 6 | 25. | 8 | 28. |

The vacuum signal created at port 68 also is delivered to an exhaust gas recirculation control valve 72. Valve 72 has a diaphragm 74 which is received between a cover 76 and a support housing 78 and is connected to a stem 80. Stem 80 extends through a sealing unit 82 into a base member 84 and is connected to a valve pintle 86. Valve pintle 86 is associated with a valve seat 88 disposed about the inlet 90 of base member 84. Inlet 90 receives exhaust gases from a portion of the engine exhaust system 92. Base member 84 has an outlet 94 connected by a passage 96 to induction passage 60 downstream of throttle 62.

In operation, with throttle 62 closed as shown, the chamber 98 defined between diaphragm 74 and cover 76 senses the atmospheric pressure at port 68 upstream of throttle 62, and a spring 100 holds valve pintle 86 against valve seat 88. As throttle 62 is opened and its upstream edge 70 traverses port 68, an increasing proportion of the manifold vacuum present downstream of throttle 62 is transmitted to chamber 98. Diaphragm 74 then lifts pintle 86 to permit recirculation of exhaust gases from exhaust system 92 to induction passage 60 at an increasing rate. Because the same source, port 68, is used for the vacuum signal controlling both EGR valve 72 and vacuum motor 10, ignition timing is advanced as the rate of exhaust gas recirculation is increased.

It will be appreciated, of course, that as throttle 62 reaches the wide open position, the manifold vacuum decreases and approaches zero. At such time, spring 100 forces valve pintle 86 back into engagement with valve 88 to prevent recirculation of exhaust gases and spring 102 in vacuum motor 10 returns diaphragms 14 and 18, connector 26 and link 36 to the position shown to retard the ignition timing from its advanced state.

It also will be appreciated that diaphragms 14 and 18 may have different effective areas if identical response to variations in their respective vacuum signals is not desired.

The embodiments of the invention in which an exclusive property or privilege is claimed are defined as follows:

1. An ignition timing control comprising a vacuum motor having first and second diaphragms, a divider between said diaphragms and defining an atmospheric pressure chamber with said first diaphragm and a manifold vacuum chamber with said second diaphragm, a cover adjacent and defining a ported vacuum chamber with said first diaphragm, and an operating link secured to said first diaphragm and having an enlarged portion, said second diaphragm having a central opening slidably receiving said link and being engageable with said enlarged portion of said link whereby upon application of a vacuum signal to said manifold vacuum chamber said second diaphragm may engage said enlarged portion of said link to move said link a limited amount and whereby upon application of a vacuum signal to said ported vacuum chamber said first diaphragm may move said link an additional amount independently of said second diaphragm.

2. In an internal combustion engine having an induction passage for air flow to the engine, a throttle disposed in said passage and rotatable between closed and open positions for controlling air flow therethrough, an exhaust system, a recirculation passage extending from said exhaust system to said induction passage, a valve disposed in said recirculation passage and movable between closed and open positions for controlling exhaust gas flow therethrough, a control disphragm for moving said valve, and an ignition system: an ignition timing control comprising a vacuum motor having first and second diaphragms, a divider between said diaphragms and defining an atmospheric pressure chamber with said first diaphragm and a manifold vacuum chamber with said second diaphragm, a cover adjacent and defining a ported vacuum chamber with said first diaphragm, an operating link secured to said first diaphragm, said second diaphragm having a central opening slidably receiving said link and being engageable with an enlarged portion of said link, means including a tap opening from said induction passage downstream of said throttle for applying a manifold vacuum signal to said manifold vacuum chamber to cause said second diaphragm to engage said enlarged portion of said link and move said link a limited amount for advancing the ignition timing, and means including a port opening from said induction passage upstream of said throttle when said throttle is in said closed position and traversed by said throttle as said throttle is rotated for applying a ported vacuum signal to said ported vacuum chamber and to said control diaphragm to cause said first diaphragm to move said link an additional amount independently of said second diaphragm for further advancing the ignition timing and to cause said control diaphragm to simultaneously move said valve for increasing exhaust gas flow through said recirculation passage.

* * * * *